United States Patent (10) Patent No.: US 8,478,318 B2
Tsai et al. (45) Date of Patent: Jul. 2, 2013

(54) HETEROGENEOUS WIRELESS SENSOR NETWORK BRIDGING DEVICE AND CONTROL METHOD AND FLOW BALANCING METHOD THEREOF

(75) Inventors: Li-Feng Tsai, Taipei (TW); Shih-Min Tzeng, Tainan (TW); Cheng-Wei Wang, Tainan (TW); Zhung-Xing Xiao, Kaohsiung (TW)

(73) Assignee: Industrial Technology Research Institute, Hsinchu (TW)

( * ) Notice: Subject to any disclaimer, the term of this patent is extended or adjusted under 35 U.S.C. 154(b) by 497 days.

(21) Appl. No.: 12/784,741

(22) Filed: May 21, 2010

(65) Prior Publication Data

US 2011/0136433 A1 Jun. 9, 2011

(30) Foreign Application Priority Data

Dec. 4, 2009 (TW) .............................. 98141631 A

(51) Int. Cl.
*H04Q 7/20* (2006.01)
(52) U.S. Cl.
USPC ......... 455/500; 455/41.1; 455/41.2; 455/445; 455/403; 455/426.1; 370/310; 370/338; 370/343; 370/347
(58) Field of Classification Search
USPC ............... 455/41.1, 41.2, 422.1, 403, 445, 455/500, 517, 575.1, 550.1, 552.1, 553.1, 455/7, 11.1, 426.1, 426.2; 370/310, 338, 370/343, 347
See application file for complete search history.

(56) References Cited

U.S. PATENT DOCUMENTS

| | | | |
|---|---|---|---|
| 5,930,683 A | 7/1999 | Plocher | |
| 6,009,264 A | 12/1999 | Merritt et al. | |
| 6,768,896 B2 | 7/2004 | Tjalldin et al. | |
| 7,039,358 B1 | 5/2006 | Shellhammer et al. | |
| 7,076,783 B1 | 7/2006 | Frank et al. | |
| 7,260,360 B2 | 8/2007 | Seo et al. | |
| 7,289,529 B2 | 10/2007 | Sherman | |
| 7,430,400 B2 | 9/2008 | Russo et al. | |
| 2007/0115827 A1* | 5/2007 | Boehnke et al. | 370/236 |
| 2009/0252032 A1* | 10/2009 | Jiang et al. | 370/217 |
| 2010/0039284 A1* | 2/2010 | Hall et al. | 340/825.36 |
| 2010/0085948 A1* | 4/2010 | Yu et al. | 370/338 |

* cited by examiner

*Primary Examiner* — Keith Ferguson
(74) *Attorney, Agent, or Firm* — Morris Manning & Martin LLP; Tim Tingkang Xia, Esq.

(57) ABSTRACT

A control method for a heterogeneous wireless sensor network (WSN) bridging device includes initializing Zigbee sensor nodes, switching a Zigbee transceiver module to a sleep mode, switching a wireless network transceiver module to an active mode, receiving an task list from a remote main control device, switching the wireless network transceiver module to the sleep mode, switching the Zigbee transceiver module to the active mode, transmitting an operating instruction to the Zigbee sensor nodes, receiving at least one sensing signal from the Zigbee sensor nodes, and determining whether the sensing signals have been received. If yes, a back transmission procedure is executed. The control method solves an interference problem among heterogeneous wireless networks and overcomes a bottleneck in data transmission.

19 Claims, 5 Drawing Sheets

HETEROGENEOUS WIRELESS SENSOR NETWORK BRIDGING DEVICE AND CONTROL METHOD AND FLOW BALANCING METHOD THEREOF

CROSS-REFERENCE TO RELATED APPLICATIONS

This non-provisional application claims priority under 35 U.S.C. §119(a) on Patent Application No(s). 098141631 filed in Taiwan, R.O.C. on Dec. 4, 2009, the entire contents of which are hereby incorporated by reference.

BACKGROUND

1. Field of the Disclosure

The present disclosure relates to a control method for a bridging device and a bridging device using the method, and more particularly to a control method for a wireless sensor network (WSN) bridging device, a transmission flow balancing method, and a heterogeneous WSN bridging device using the method.

2. Related Art

A WSN is a network system formed by one or more wireless data collectors and a plurality of sensors, in which the communication among the elements adopts a wireless communication manner.

The potential applications of the WSN are quite wide, including, for example, military battlefield scouting, environmental pollution monitoring, weather information collection, health/medical nursing, traffic flow observation, and factory automation control.

In order to achieve an object of being widely constructed, the WSN needs to have low cost, low power consumption, and small volume, needs to be easily constructed, programmable, and dynamically formed, and needs to have an environment sensing devices, as well as other characteristics.

Considering the above characteristics, a technical standard named Zigbee is proposed in the industry to serve as a WSN communication protocol. The ZigBee is mainly proposed by the Institute of Electrical and Electronics Engineers (IEEE) 802.15.4 working group and ZigBee Alliance, which respectively formulate hardware standard and software standard. The ZigBee is a technique having a low transmission rate (from 20 kilo bits per second (kbps) to 250 kbps), a short distance (usually approximately from 50 m to 100 m, or reach 300 m depending upon different electric power consumptions), a low power consumption (usually approximately 1 milliwatts), and a simple architecture. Currently, the formulated frequency bands include global 2.4 GHz frequency band, 915 MHz frequency band in the US, and 868 MHz frequency band in European.

In another aspect, a ZigBee bridging device needs to have the Zigbee communication protocol and another communication network protocol, so as to transmit sensing information to a remote main control device. However, due to the difference in the data transmission bandwidths between two different heterogeneous networks, the bridging device disposed between the two different heterogeneous networks faces a bottleneck during the data transmission.

In addition, if the ZigBee and the wireless local area network (WLAN) are used at the same time, since the ZigBee and the WLAN both use 2.4 GHz frequency band, the signals of the ZigBee and the WLAN interfere each other when the ZigBee and the WLAN are actuated at the same time, thereby deteriorating the communication quality.

SUMMARY

In view of the above problems, the present disclosure is a control method for a WSN bridging device and a heterogeneous WSN bridging device using the method, applicable to solve the interference problem among signals of heterogeneous wireless networks and overcome a bottleneck in transmission.

The present disclosure provides a heterogeneous WSN bridging device, which comprises a Zigbee transceiver module, a wireless network transceiver module, a processor, a register, a first transmission interface, and a second transmission interface. The WSN bridging device is used to bridge a plurality of Zigbee sensor nodes and a remote main control device.

The Zigbee transceiver module is used for establishing a Zigbee wireless link with the Zigbee sensor nodes. The wireless network transceiver module is used for establishing a wireless network link with the remote main control device. The processor is used for controlling the Zigbee transceiver module and the wireless network transceiver module to perform message handshaking and data transmission, and is selectively connected to the Zigbee wireless link or the wireless network link. The register is electrically connected to the processor, and is used for registering data. The first transmission interface is electrically connected between the Zigbee transceiver module and the processor. The second transmission interface is electrically connected between the wireless network transceiver module and the processor.

The present disclosure further provides a control method for a heterogeneous WSN bridging device, which comprises: initializing Zigbee sensor nodes, switching a Zigbee transceiver module to a sleep mode, switching a wireless network transceiver module to an active mode, receiving an task list from a remote main control device, switching the wireless network transceiver module to the sleep mode, switching the Zigbee transceiver module to the active mode, transmitting an operating instruction to the Zigbee sensor nodes, receiving at least one sensing signal from the Zigbee sensor nodes, and determining whether the sensing signals have been received. If yes, a back transmission procedure is executed; otherwise, it is further determined whether a timeout occurs, in which if the timeout does not occur, at least one sensing signal is continuously received from the Zigbee sensor nodes; if the timeout occurs, the back transmission procedure is executed.

The back transmission procedure comprises storing states of the Zigbee sensor nodes, switching the Zigbee transceiver module to the sleep mode, switching the wireless network transceiver module to the active mode, transmitting the sensing signals to the remote main control device, and downloading another task list.

The present disclosure further provides a transmission flow balancing method, applicable to control links between a WSN bridging device and a plurality of Zigbee sensor nodes. The plurality of Zigbee sensor nodes and the WSN bridging device are connected through a plurality of Zigbee routers. The transmission flow balancing method comprises: analyzing a transmission flow of each Zigbee router; sorting the plurality of Zigbee routers according to the transmission flow of each Zigbee router; and determining whether a difference between the Zigbee router having a maximum transmission flow and the Zigbee router having a minimum transmission flow is greater than a reference value, and if yes, executing a frequency changing step.

The frequency changing step comprises: switching a frequency band of one of the Zigbee sensor nodes connected to the Zigbee router having the maximum transmission flow to another frequency band used by the Zigbee router having the minimum transmission flow; and searching whether the Zigbee sensor node is connected to the Zigbee router having the minimum transmission flow.

If yes, the Zigbee router having the maximum transmission flow is notified that the frequency band of the Zigbee sensor node has been switched.

If not, the following steps are executed. The Zigbee sensor node is switched to the frequency band used by the Zigbee router having the minimum transmission flow in the Zigbee routers that are not ever connected to the Zigbee sensor node.

In the control method for the WSN bridging device and the heterogeneous WSN bridging device using the method according to the present disclosure, the bridging device can solve the interference problem between the wireless network and the Zigbee network having the same frequency band, and overcome the bottleneck in data transmission.

BRIEF DESCRIPTION OF THE DRAWINGS

The present disclosure will become more fully understood from the detailed description given herein below for illustration only, and thus is not limitative of the present disclosure, and wherein.

DETAILED DESCRIPTION

The detailed features and advantages of the present disclosure will be described in detail in the following embodiments. Those skilled in the arts can easily understand and implement the content of the present disclosure accordingly. Furthermore, the relevant objectives and advantages of the present disclosure are apparent to those skilled in the arts with reference to the content disclosed in the specification, claims, and drawings. The embodiments below are intended to further describe the views of the present disclosure, instead of limiting the scope of the present disclosure.

Figure 1A:
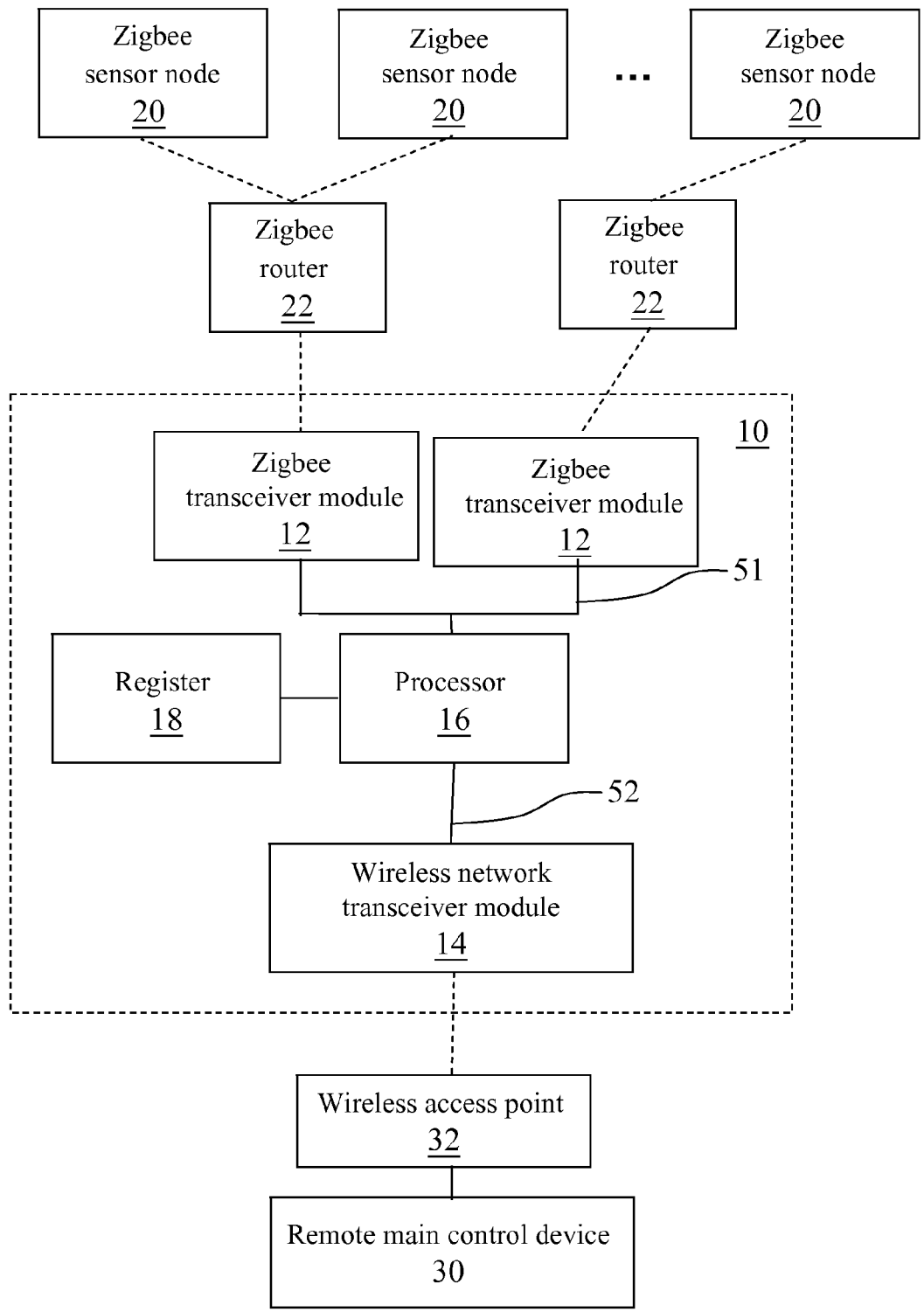
FIG. 1A is a systematic block diagram of a heterogeneous WSN bridging device according to the present disclosure.

FIG. 1A is a systematic block diagram of a heterogeneous WSN bridging device according to the present disclosure. Referring to FIG. 1A, a heterogeneous WSN bridging device 10 comprises Zigbee transceiver modules 12, a wireless network transceiver module 14, a processor 16, a register 18, a first transmission interface 51, and a second transmission interface 52. The heterogeneous WSN bridging device 10 is used for bridging a plurality of Zigbee sensor nodes 20 and a remote main control device 30.

In the device, the Zigbee transceiver modules 12 are used for establishing Zigbee wireless links with the Zigbee sensor nodes 20. The Zigbee transceiver modules 12 are connected to the Zigbee sensor nodes 20 through Zigbee routers 22. In addition, the heterogeneous WSN bridging device 10 preferably comprises a plurality of Zigbee transceiver modules 12 and a plurality of Zigbee routers 22, thereby increasing an upper limit of a number of the Zigbee sensor nodes 20 that can be connected to the heterogeneous WSN bridging device 10.

The wireless network transceiver module 14 is used for establishing a wireless network link with the remote main control device 30. The remote main control device 30 is connected to the wireless network transceiver module 14 through a wireless access point 32, or is directly connected to the wireless network transceiver module 14 in an ad-hoc mode.

The register 18 is electrically connected to the processor 16, and is used for storing data. The processor 16 is used for controlling the Zigbee transceiver modules 12 and the wireless network transceiver module 14 to perform message handshaking and data transmission, and is selectively connected to the Zigbee wireless links or the wireless network link. In addition, the processor 16 may perform scheduling, transmission power management, and power source management, as well as other steps. Detailed operating process of the Zigbee transceiver modules 12, the wireless network transceiver module 14, and the processor 16 are described hereafter.

The Zigbee transceiver modules 12, the wireless network transceiver module 14, and the processor 16 may be individually or completely system on chips (SOCs), field programmable gate arrays (FPGAs), application-specific integrated circuits (ASICs), or digital signal processors (DSPs).

The first transmission interface 51 is electrically connected between the Zigbee transceiver module 12 and the processor 16, and the second transmission interface 52 is electrically connected between the wireless network transceiver module 14 and the processor 16. The first transmission interface 51 and the second transmission interface 52 may be universal asynchronous receivers/transmitters (UARTs), serial peripheral interfaces (SPIs), internal integrated circuits (IICs), or general purpose I/Os (GPIOs).

Figure 1B:
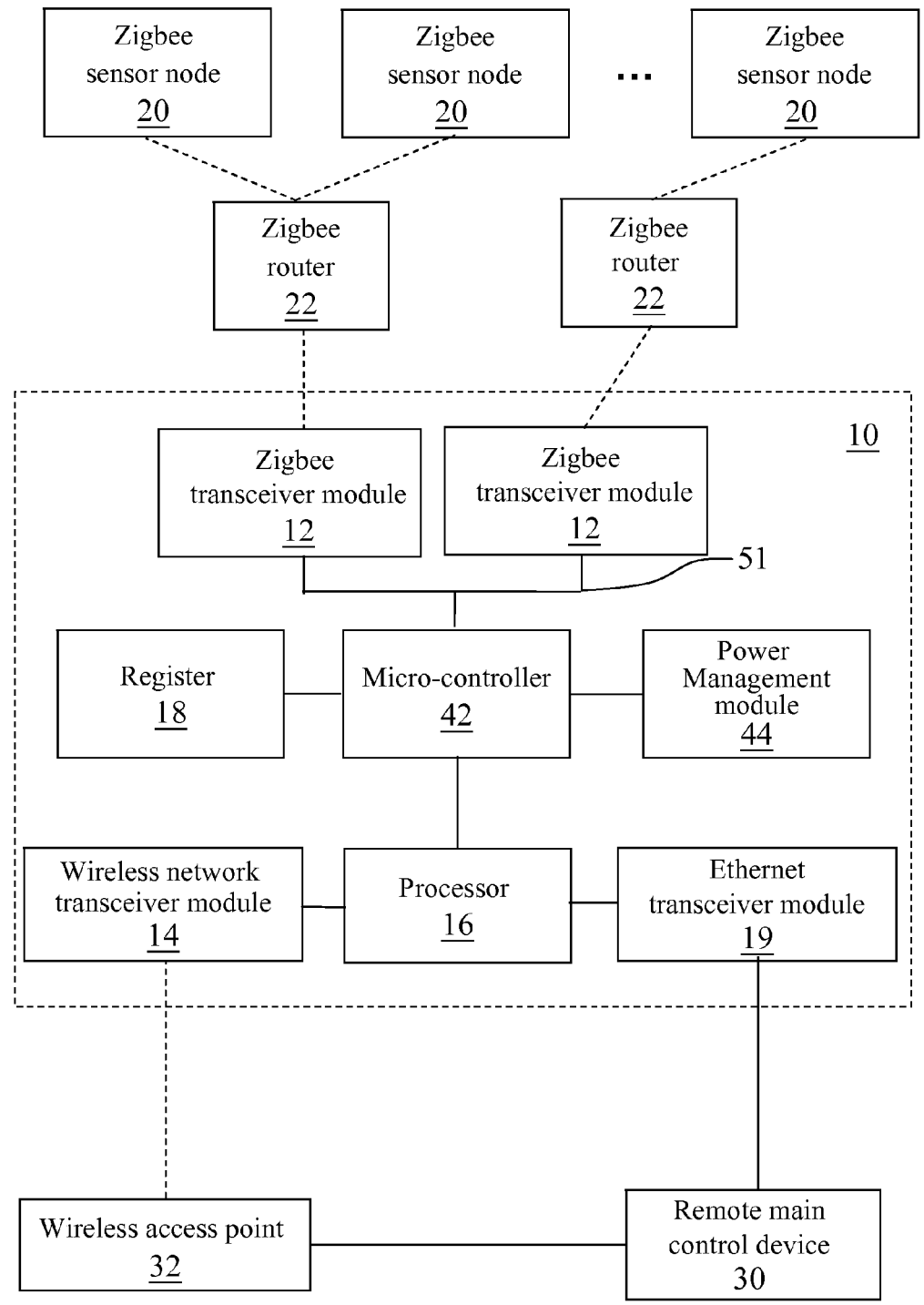
FIG. 1B is a systematic block diagram of a heterogeneous WSN bridging device according to another embodiment of the present disclosure.

FIG. 1B is a systematic block diagram of a heterogeneous WSN bridging device according to another embodiment of the present disclosure. Referring to FIG. 1B, in this embodiment, a heterogeneous WSN bridging device 10 comprises Zigbee transceiver modules 12, a wireless network transceiver module 14, a processor 16, a register 18, a first transmission interface 51, a second transmission interface 52, a micro-controller 42, a power management module 44, and an Ethernet transceiver module 19.

The micro-controller 42 is used for controlling the Zigbee transceiver modules 12. In addition, the micro-controller 42 may be connected to the power management module 44, so as to control a power of the Zigbee transceiver modules 12. Therefore, the Zigbee transceiver modules 12 are enabled to perform transmitting and receiving operations with an appropriate power, thereby avoiding power waste.

In addition, the heterogeneous WSN bridging device 10 establishes an Ethernet link with a remote main control device 30 through the Ethernet transceiver module 19. The Ethernet link may serve as an alternative link for the wireless network link.

Figure 2:
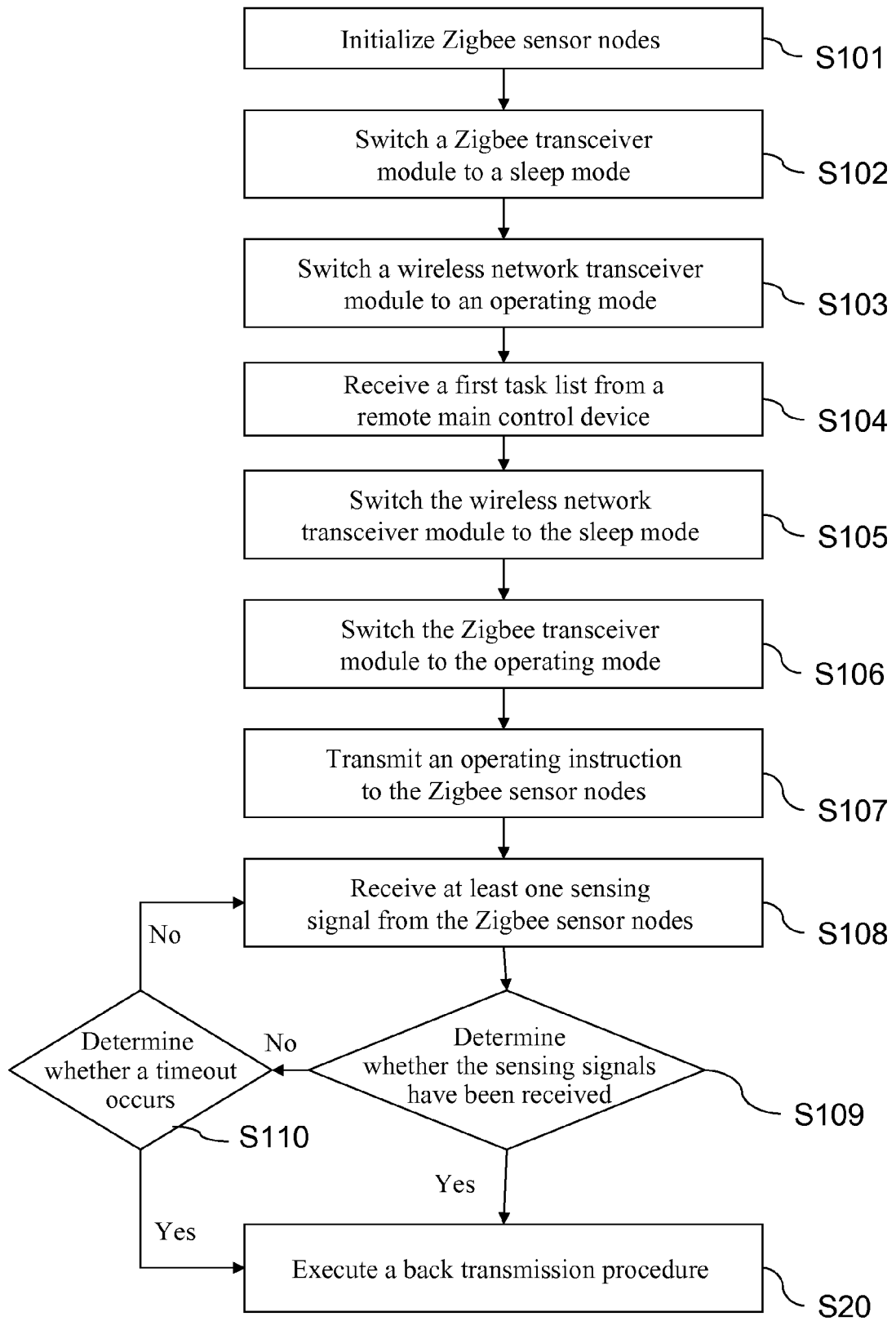
FIG. 2 is a flow chart of a control method according to the present disclosure.

FIG. 2 is a flow chart of a control method according to the present disclosure. Referring to FIG. 2, the present disclosure provides a control method for a heterogeneous WSN bridging device, which comprises: initializing Zigbee sensor nodes (S101), switching a Zigbee transceiver module to a sleep mode (S102), switching a wireless network transceiver module to an active mode (S103), receiving a first task list from a remote main control device (S104), switching the wireless network transceiver module to the sleep mode (S105), switching the Zigbee transceiver module to the active mode (S106), transmitting an operating instruction to the Zigbee sensor nodes (S107), receiving at least one sensing signal from the Zigbee sensor nodes (S108), and determining whether the sensing signals have been received (S109), and if yes, executing a back transmission procedure (S20); if not, determining whether a timeout occurs (S110), if the timeout do not occur, the flow returns to Step (S108); otherwise, the back transmission procedure is executed (S20).

In Step (S101), the Zigbee transceiver module transmits an initialization signal to each Zigbee sensor node in a broadcast mode. At this time, each Zigbee sensor node returns a short address and an identification code. Afterwards, according to the returned short address and identification code, the Zigbee transceiver module determines whether the message handshaking operation is completed.

After completing the initializing and message handshaking step, Step (S102) is executed, in which the Zigbee transceiver module is switched to the sleep mode. At this time, the Zigbee sensor nodes temporarily stop transmitting data, thereby reducing the electric power consumption.

In Step (S103), the wireless network transceiver module is switched to the active mode. The Zigbee transceiver module and the wireless network transceiver module may both use a 2.4 GHz frequency band for data transmission, and if the two transceiver modules are both in the active mode, the two transceiver modules may interfere each other. That is to say, at the same time point, only one of the Zigbee transceiver module and the wireless network transceiver module can be switched to the active mode. When one of the transceiver modules is switched to the active mode, the other transceiver module needs to be switched to the sleep mode.

In Step (S104), the first task list is received from the remote main control device. The first task list is transmitted by using a wireless network link established between the remote main control device and the wireless network transceiver module. The first task list may be automatically generated by the remote main control device, or input by a user through an input device of the remote main control device. After receiving the first task list, the wireless network transceiver module transmits the first task list to the processor through a second transmission interface, and registers the first task list in a register.

The first task list comprises an operating instruction, an identification item, and a state item. The identification item is used for recording an identification code preset for each Zigbee sensor node. After comparing the identification codes preset in the first task list with the returned identification codes, the processor may record Zigbee sensor nodes that cannot establish links with the Zigbee transceiver module.

The operating instruction stores a sensing operation type, a sensing data back transmission times, and a sensing data back transmission period and other parameters preset for each Zigbee sensor node. The sensing operation type is mainly corresponding to the type of the sensor on the Zigbee sensor node. For example, the sensing operation type of a temperature sensor is temperature measurement, and the sensing operation type of a humidity sensor is humidity measurement. That is to say, the WSN bridging device is applicable to connect the WSN formed by various different types of sensors, thereby improving the using flexibility of the WSN. The sensing data back transmission times and the sensing data back transmission period are mainly used for executing network management.

Then, the wireless network transceiver module is switched to the sleep mode (S105), and the Zigbee transceiver module is switched to the active mode (S106), in which the objectives of the two steps are similar to that of Steps (S102) and (S103).

After being switched to the active mode, the Zigbee transceiver module transmits the operating instruction to the Zigbee sensor nodes (S107). According to the operating instruction, the Zigbee sensor nodes start to collect sensing signals, and periodically (with equal or unequal time periods) transmit the sensing signals back.

Next, the Zigbee transceiver module receives at least one sensing signal from the Zigbee sensor nodes (S108). The Zigbee transceiver module transmits the sensing signals to the processor through a first transmission interface, and stores the sensing signals in the register.

At this time, the processor records the number of the sensing signals transmitted to and stored in the register. In addition, the processor also starts to record the time spent on transmitting the sensing signals. The processor determines whether the sensing signals have been received according to the number of the transmitted sensing signals (S109), in which if yes, the back transmission procedure is executed (S20); otherwise, it is continuously determined whether a timeout occurs to the operation of receiving the sensing signals (S110).

In the step of determining whether the timeout occurs to the operation, a reasonable transmission time is deduced according to the sensing data back transmission times and the sensing data back transmission period. When the time spent on transmitting the sensing signals exceeds the reasonable transmission time, it is determined that the timeout occurs to the operation of receiving the sensing signals, and vice versa.

If it is determined that the timeout does not occur to the operation, the flow returns to Step (S108), in which the sensing signals are continuously received. If it is determined that the timeout occurs to the operation, the back transmission procedure is executed (S20).

Figure 3:
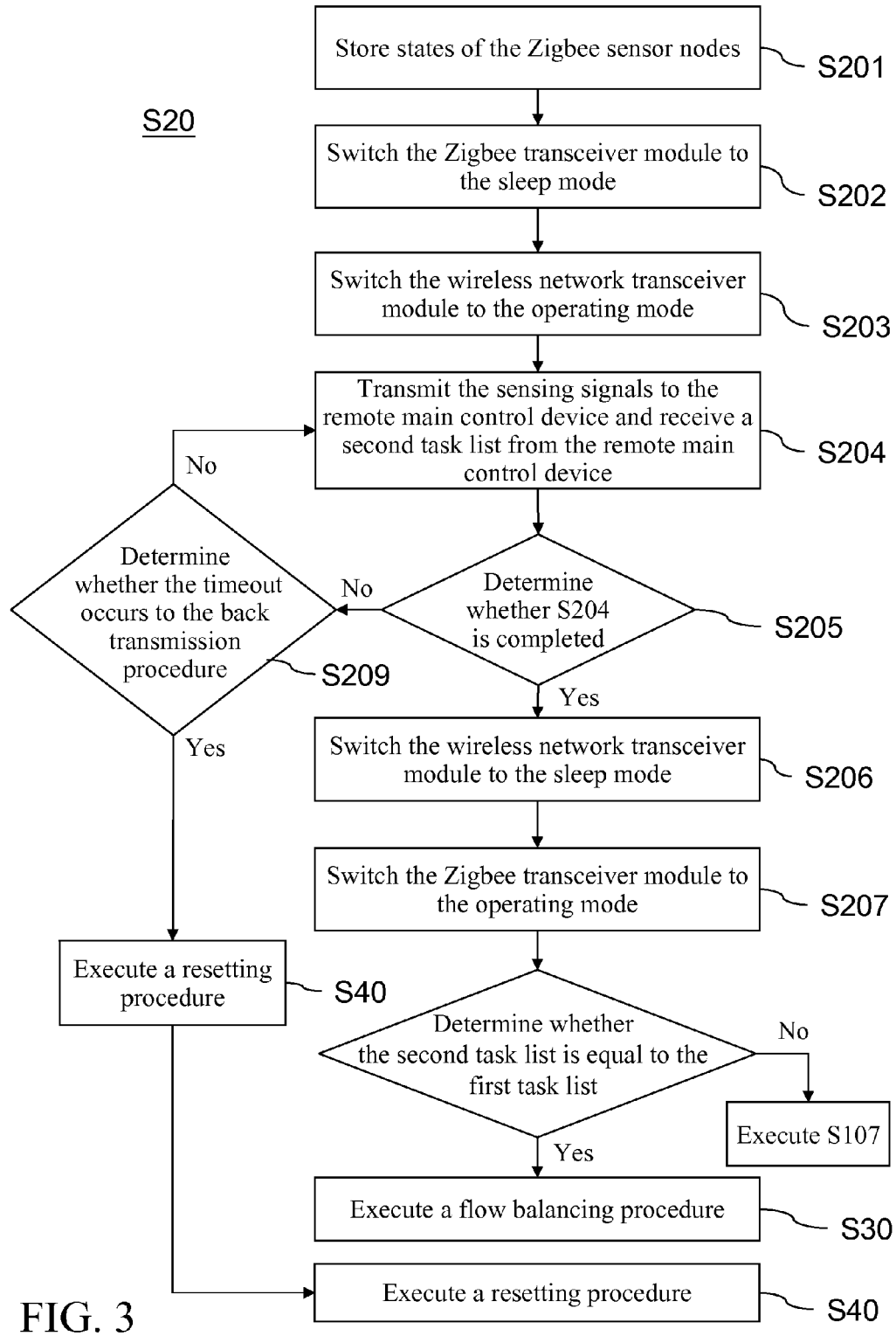
FIG. 3 is a flow chart of a back transmission procedure according to the present disclosure.

FIG. 3 is a flow chart of a back transmission procedure according to the present disclosure. Referring to FIG. 3, the back transmission procedure (S20) comprises: storing states of the Zigbee sensor nodes (S201), switching the Zigbee transceiver module to the sleep mode (S202), switching the wireless network transceiver module to the active mode (S203), transmitting the sensing signals to the remote main control device, receiving a second task list from the remote main control device (S204), and determining whether S204 is completed (S205).

In (S201), the processor stores the states of all the Zigbee sensor nodes or stores Zigbee sensor nodes that cannot establish the links or do not transmit data back after the timeout occurs to the operation. That is to say, the processor records the Zigbee sensor nodes where the failure occurs, thereby performing back transmission to the remote main control device. The remote main control device determines whether to establish the links once again or send a message to the user depending upon the actual situations.

Next, the Zigbee transceiver module is switched to the sleep mode (S202), and the wireless network transceiver module is switched to the active mode (S203), which similarly aim at avoiding the interferences between the two transceiver modules.

After being switched to the active mode, the wireless network transceiver module transmits the sensing signals to the remote main control device and receives the second task list from the remote main control device (S204). The wireless network transceiver module is a full duplex transmission module, that is to say, the wireless network transceiver module may transmit and receive data at the same time.

In (S204), the wireless network transceiver module may transmit the states of the Zigbee sensor nodes (all the Zigbee sensor nodes or the possibly failed Zigbee sensor nodes) to the remote main control device.

In (S204), the second task list may be generated according to the current states of the Zigbee sensor nodes, or a new task list may be input by the user.

After (S204), it is determined whether the step of transmitting the sensing signals to the remote main control device and receiving the second task list from the remote main control device is completed (S205).

If it is determined that the step of receiving the second task list is completed, the wireless network transceiver module is switched to the sleep mode (S206), and the Zigbee transceiver module is switched to the active mode (S207). Next, it is determined whether the second task list is equal to the first task list (S208), in which if yes, a flow balancing procedure is executed (S30); otherwise, Step (S107) is executed. The flow balancing procedure is described hereafter.

If it is determined that the step of receiving the second task list is not completed, it is further determined whether a timeout occurs to the back transmission procedure (S209). The step of determining whether the timeout occurs to the back transmission procedure is equivalent to determining whether a link exists between the remote main control device and the wireless network transceiver module. When determining whether the timeout occurs to the procedure, a transmission time is predicted according to the original first task list, and it is determined whether the timeout occurs to the procedure according to the predicted transmission time.

If it is determined that the timeout does not occur, Step (S204) is executed, in which the data is continuously transmitted and received.

If it is determined that the timeout occurs, it indicates that the remote main control device or the wireless network transceiver module possibly fails. Therefore, such an exception event is recorded in the heterogeneous WSN bridging device, and a system resetting procedure is executed (S40), thereby starting to execute the bridging operation once again. In the system resetting procedure, the Zigbee transceiver module is stopped from operating, and the wireless network transceiver module is switched to the sleep mode.

Figure 4:
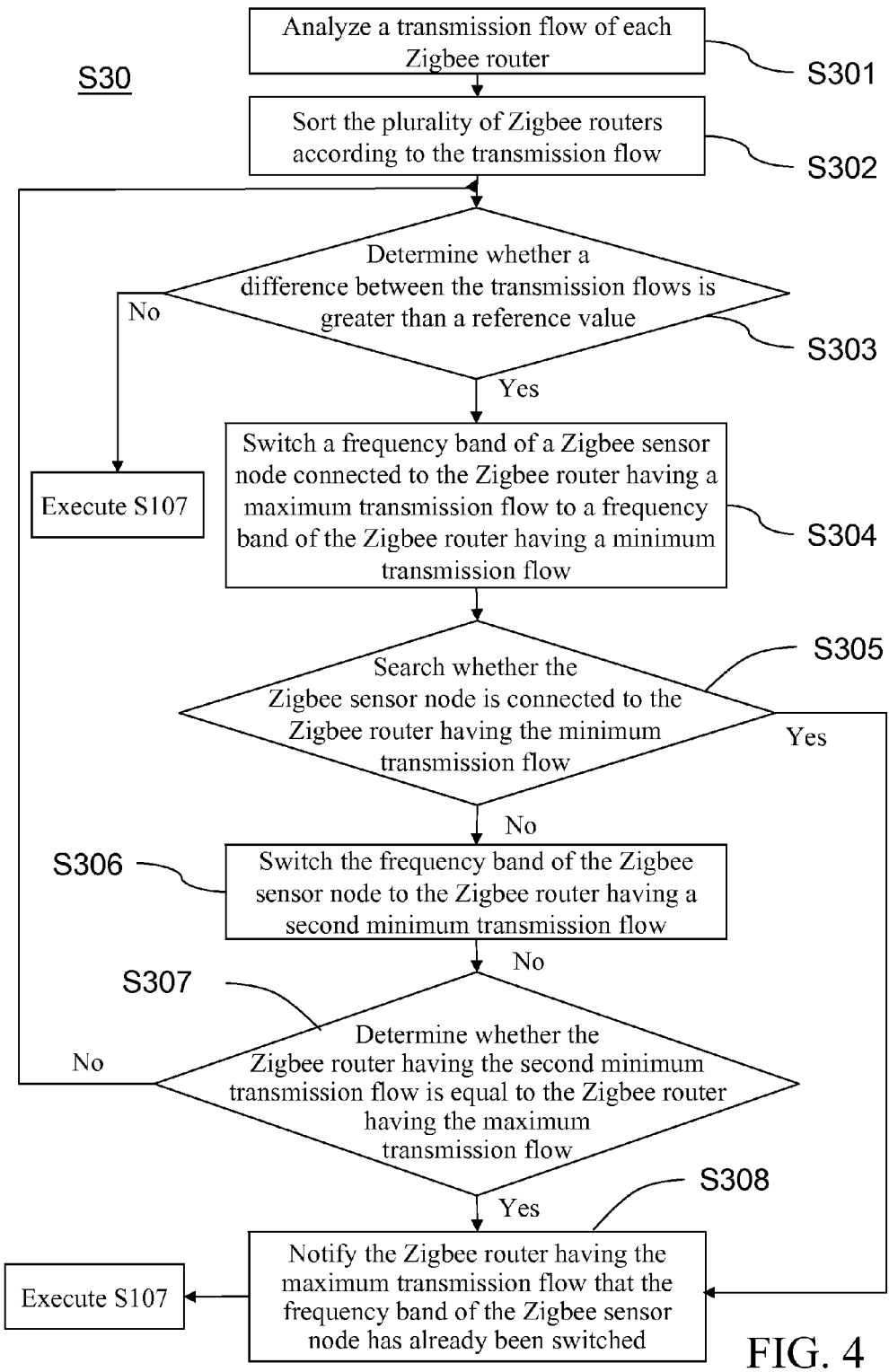
FIG. 4 is a flow chart of a flow balancing procedure according to the present disclosure.

FIG. 4 is a flow chart of a flow balancing procedure according to the present disclosure. Referring to FIG. 4, the flow balancing procedure (S30) comprises: analyzing a transmission flow of each Zigbee router (S301); sorting the plurality of Zigbee routers according to the transmission flow (S302); and determining whether a difference between the transmission flows is greater than a reference value (S303).

If the difference is greater than the reference value, a frequency band of a Zigbee sensor node connected to the Zigbee router having a maximum transmission flow is switched to a frequency band of the Zigbee router having a minimum transmission flow (S304), and it is searched whether the Zigbee sensor node is connected to the Zigbee router having the minimum transmission flow (S305). If yes, the Zigbee router having the maximum transmission flow is notified that the frequency band of the Zigbee sensor node has already been switched (S308), and Step (S107) is repeated; and if not, the frequency band of the Zigbee sensor node is switched to the Zigbee router having a second minimum transmission flow (S306), and it is determined whether the Zigbee router having the second minimum transmission flow is equal to the Zigbee router having the maximum transmission flow (S307), in which if yes, Step (S308) is executed; otherwise, the flow returns to Step (S303).

If the difference is smaller than the reference value, Step (S107) is executed.

The flow balancing procedure aims at reducing the difference among the transmission flows of the Zigbee routers. If the transmission flow of the Zigbee router is extremely high, the Zigbee router requires quite a long time for transmission. The heterogeneous WSN bridging device cannot execute other steps until the Zigbee router having the extremely high transmission flow completes the transmission. Thus, when the transmission flow of certain Zigbee router is extremely high, a transmission efficiency of the heterogeneous WSN bridging device is reduced, so as to result in a bottleneck in the transmission. The flow balancing procedure is described below in detail.

In Step (S301), the transmission flow of each Zigbee router is analyzed according to the first task list. For example, the heterogeneous WSN bridging device is totally connected to seven Zigbee sensor nodes (respectively represented by N1, N2, N3, N4, N5, N6, and N7). The nodes N1, N2, and N3 are respectively connected to a first Zigbee router G1, the nodes N4 and N5 are respectively connected to a second Zigbee router G2, and the nodes N6 and N7 are respectively connected to a third Zigbee router G3.

It is assumed that a sampling rate for the sensing data of the node N1 is 50 KHz, a sampling time is 10 seconds, and each sampling data is represented by 2 bits. According to the above figures, it may be deduced that the flow of the node N1 is 1 Mb. Similarly, it is assumed that a flow of the node N2 is 3 Mb, a flow of the node N3 is 5 Mb, a flow of the node N4 is 1 Mb, a flow of the node N5 is 2 Mb, a flow of the node N6 is 3 Mb, and a flow of the node N7 is 4 Mb.

The flow of each Zigbee router is a sum of the flows of all the nodes connected to the Zigbee router. Therefore, a flow of the first Zigbee router G1 is 9 Mb, a flow of the second Zigbee router G2 is 3 Mb, and a flow of the third Zigbee router G3 is 7 Mb.

Next, according to the transmission flow, the plurality of Zigbee routers is sorted (S302). a result of sorting the Zigbee routers from large to small transmission flows is sequentially the first Zigbee router G1, the third Zigbee router G3, and the second Zigbee router G2.

Afterwards, in Step (S303), it is determined whether the difference between the Zigbee router having the maximum transmission flow and the Zigbee router having the minimum transmission flow is greater than the reference value. In this step, it is determined whether a result obtained by dividing the transmission flow of the Zigbee router having the maximum transmission flow by the transmission flow of the Zigbee router having the minimum transmission flow is greater than a reference value, or it is determined whether a result obtained by subtracting the transmission flow of the Zigbee router having the minimum transmission flow from the transmission flow of the Zigbee router having the maximum transmission flow is greater than a reference value.

In this embodiment, it is assumed that a result obtained by dividing the transmission flow (9 Mb) of the Zigbee router having the maximum transmission flow by the transmission flow (3 Mb) of the Zigbee router having the minimum transmission flow is smaller than the reference value (it is assumed that the reference value is 4). Therefore, a frequency band of a Zigbee sensor node connected to the Zigbee router having the maximum transmission flow is switched to the frequency band of the Zigbee router having the minimum transmission flow (S304). Here, a basic reference value may be set, and the basic reference value is a value obtained by further dividing the result of subtracting the transmission flow of the Zigbee router having the minimum transmission flow from the transmission flow of the Zigbee router having the maximum transmission flow by two, that is to say, the basic reference value equals to (9 Mb−3 Mb)/2=3 Mb. One sensor node having a transmission flow being mostly close to the basic reference value is selected from the sensor nodes connected to the Zigbee router having the maximum transmission flow. In this embodiment, the sensor node having the transmission flow being mostly close to the basic reference value (3 Mb) is the node N2.

Next, the frequency band of the node N2 is switched from the frequency band used by the Zigbee router having the maximum transmission flow to the frequency band used by the Zigbee router having the minimum transmission flow, that is to say, Step S304 is performed. The frequency bands here may be different channels of the Zigbee network. It is assumed that the channel used by the Zigbee router G1 having the maximum transmission flow is a first channel (channel 1), and the channel used by the Zigbee router G2 having the minimum transmission flow is a fourth channel (channel 4). Here, the node N2 is switched from the originally used first channel to the fourth channel.

Afterwards, it is searched whether the node N2 can be connected to the Zigbee router G2 having the minimum transmission flow, that is to say, Step (S305) is performed. If the node N2 can be connected to the Zigbee router G2, that is, the node N2 is located within a communication scope of the Zigbee router, the Zigbee router G1 having the maximum transmission flow is notified that the frequency band of the node N2 has been switched to the fourth channel. The Zigbee router G1 updates a routing table thereof. Here, it represents that the flow balancing procedure is completed. After the flow balancing procedure is completed, the operating instruction in the first task list is transmitted to each Zigbee sensor node, that is to say, Step (S107) is repeated.

If the node N2 cannot be connected to the Zigbee router G2, the frequency band used by the node N2 is continuously switched to a frequency band used by the Zigbee router G3 having a second minimum transmission flow, that is to say, Step (S306) is performed. Then, it is determined whether the Zigbee router having the second minimum transmission flow is equal to the Zigbee router having the maximum transmission flow.

When it is determined that the Zigbee router having the second minimum transmission flow is different from the Zigbee router having the maximum transmission flow, the frequency band used by the node N2 is switched to the frequency band used by the Zigbee router G3. That is to say, Step (S304) and subsequent steps are performed.

After the flow balancing procedure has been executed, if the node N2 is switched from being originally connected to the first Zigbee router G1 to being connected to the second Zigbee router G2, considering the flows of all the routers, the transmission flow of the first Zigbee router G1 is 6 Mb, the transmission flow of the second Zigbee router G2 is 6 Mb, and the transmission flow of the third Zigbee router G3 is 7 Mb. As known from the above embodiment, the difference among the transmission flows of different Zigbee routers is greatly reduced.

In the control method for the WSN bridging device and the heterogeneous WSN bridging device using the method according to the present disclosure, the bridging device can solve the interference problem between the wireless network and the Zigbee network having the same frequency band, and overcome the bottleneck in data transmission.

What is claimed is:

1. A control method for a heterogeneous wireless sensor network (WSN) bridging device, applicable to control a heterogeneous WSN bridging device, wherein the heterogeneous WSN bridging device comprises a Zigbee transceiver module, a wireless network transceiver module, and a processor, the heterogeneous WSN bridging device is used for bridging a plurality of Zigbee sensor nodes and a remote main control device, the method comprising:
    switching the wireless network transceiver module to an active mode, and receiving a first task list from the remote main control device by the wireless network transceiver module;
    switching the wireless network transceiver module to a sleep mode, and switching the Zigbee transceiver module to an active mode;
    transmitting an operating instruction to the Zigbee sensor nodes by the Zigbee transceiver module according to the first task list;
    receiving at least one sensing signal from the Zigbee sensor nodes respectively, and storing the sensing signals; and
    determining whether the sensing signals have been received according to the first task list;
    if yes, executing a back transmission procedure, wherein the back transmission procedure comprises:
    switching the Zigbee sensor nodes to the sleep mode, and switching the wireless network transceiver module to the active mode; and
    transmitting the sensing signals to the remote main control device by the wireless network transceiver module.

2. The control method for the heterogeneous WSN bridging device according to claim 1, wherein after the step of determining whether the sensing signals have been received, the method further comprises:
    if the sensing signals are not received yet, determining whether a timeout occurs to a receiving operation; and
    if the timeout occurs to the receiving operation, executing the back transmission procedure.

3. The control method for the heterogeneous WSN bridging device according to claim 2, wherein after the step of determining whether the timeout occurs to the receiving operation, the method further comprises:
    if the timeout does not occur to the receiving operation, returning to the step of receiving at least one sensing signal from the Zigbee sensor nodes respectively.

4. The control method for the heterogeneous WSN bridging device according to claim 2, wherein after the step of switching the Zigbee sensor nodes to the sleep mode and switching the wireless network transceiver module to the active mode, the method further comprises: downloading another task list and transmitting the sensing signals to the remote main control device.

5. The control method for the heterogeneous WSN bridging device according to claim 2, wherein the back transmission procedure further comprises:
    determining whether the step of downloading a second task list and transmitting the sensing signals to the remote main control device is completed; and
    if yes, returning to the step of switching the wireless network transceiver module to the sleep mode.

6. The control method for the heterogeneous WSN bridging device according to claim 5, wherein if a result of determining whether the step of downloading another task list and transmitting the sensing signals to the remote main control device is completed is no, the method further comprises:
    determining whether a timeout occurs to a back transmission operation; and
    if not, returning to the step of transmitting the sensing signals to the remote main control device.

7. The control method for the heterogeneous WSN bridging device according to claim 6, wherein if a result of determining whether the timeout occurs to the back transmission operation is yes, a resetting procedure is executed, and the resetting procedure comprises:

recording an exception event; and
sending a reset signal to the remote main control device.

8. The control method for the heterogeneous WSN bridging device according to claim 5, wherein the plurality of Zigbee sensor nodes is coupled to the heterogeneous WSN bridging device through a plurality of Zigbee routers, each of the Zigbee routers is corresponding to at least one of the Zigbee sensor nodes, and after the step of switching the wireless network transceiver module to the sleep mode, the method further comprises:
  determining whether the first task list is equal to the second task list;
  if yes, executing a flow balancing procedure; and
  if not, returning to the step of transmitting the operating instruction to the Zigbee sensor nodes by the Zigbee transceiver module.

9. The control method for the heterogeneous WSN bridging device according to claim 8, wherein determining whether to execute the flow balancing procedure comprises:
  obtaining the Zigbee router having a maximum transmission flow and the Zigbee router having a minimum transmission flow according to the first task list and a corresponding relation between the Zigbee routers and the Zigbee sensor nodes;
  switching one of the Zigbee sensor nodes coupled to the Zigbee router having the maximum transmission flow to the Zigbee router having the minimum transmission flow; and
  searching whether the Zigbee sensor node is connected to the Zigbee router having the minimum transmission flow, and if yes, notifying the Zigbee router having the maximum transmission flow that a frequency band of the Zigbee sensor node has already been switched.

10. The control method for the heterogeneous WSN bridging device according to claim 1, further comprising initializing the Zigbee sensor nodes.

11. The control method for the heterogeneous WSN bridging device according to claim 10, wherein the initializing step comprises broadcasting a start signal to the Zigbee sensor nodes.

12. The control method for the heterogeneous WSN bridging device according to claim 11, wherein the initializing step comprises confirming an identification code and a short address code of the Zigbee sensor nodes.

13. The control method for the heterogeneous WSN bridging device according to claim 12, wherein after the initializing step, the method comprises switching the Zigbee transceiver module to the sleep mode.

14. A flow balancing method, applicable to control links between a heterogeneous wireless sensor network (WSN) bridging device and a plurality of Zigbee sensor nodes, wherein the plurality of Zigbee sensor nodes and the heterogeneous WSN bridging device are connected through a plurality of Zigbee routers, the method comprising:
  analyzing a transmission flow of each of the Zigbee routers;
  sorting the plurality of Zigbee routers according to the transmission flow of each of the Zigbee routers; and
  determining whether a difference between the Zigbee router having a maximum transmission flow and the Zigbee router having a minimum transmission flow is greater than a reference value, and if yes, executing a frequency changing step;

wherein the frequency changing step comprises:
  switching a frequency band of one of the Zigbee sensor nodes connected to the Zigbee router having the maximum transmission flow to another frequency band used by the Zigbee router having the minimum transmission flow; and
  searching whether the Zigbee sensor node is connected to the Zigbee router having the minimum transmission flow, and if yes, notifying the Zigbee router having the maximum transmission flow that the frequency band of the Zigbee sensor node has already been switched.

15. The flow balancing method according to claim 14, wherein if a result of the step of searching whether the Zigbee sensor node is connected to the Zigbee router having the minimum transmission flow is no, the method comprises:
  switching the frequency band of the Zigbee sensor node to the Zigbee router having a second minimum transmission flow; and
  searching whether the Zigbee sensor node is connected to the Zigbee router having the second minimum transmission flow, and if yes, notifying the Zigbee router having the maximum transmission flow that the frequency band of the Zigbee sensor node has already been switched.

16. The flow balancing method according to claim 15, wherein in the step of switching the Zigbee sensor node to the Zigbee router having the second minimum transmission flow, if the Zigbee router having the second minimum transmission flow is equal to the Zigbee router having the maximum transmission flow, the flow balancing method is stopped.

17. A heterogeneous wireless sensor network (WSN) bridging device, applicable to bridge a plurality of Zigbee sensor nodes and a remote main control device, the bridging device comprising:
  a Zigbee transceiver module, for establishing a Zigbee wireless link with the Zigbee sensor nodes;
  a wireless network transceiver module, for establishing a wireless network link with the remote main control device; and
  a processor, selectively connected to the Zigbee wireless link or the wireless network link, for controlling the Zigbee transceiver module and the wireless network transceiver module to perform message handshaking and data transmission,
  wherein only one of the Zigbee transceiver module and the wireless network transceiver module is switched to an active mode at the same time point when receiving a first task list from the remote main control device.

18. The bridging device according to claim 17, further comprising: an Ethernet transceiver module, for establishing an Ethernet link with the remote main control device.

19. The bridging device according to claim 17, further comprising:
  a register, electrically connected to the processor;
  a first transmission interface, electrically connected between the Zigbee transceiver module and the processor; and
  a second transmission interface, electrically connected between the wireless network transceiver module and the processor.

* * * * *